Patented Mar. 1, 1927.

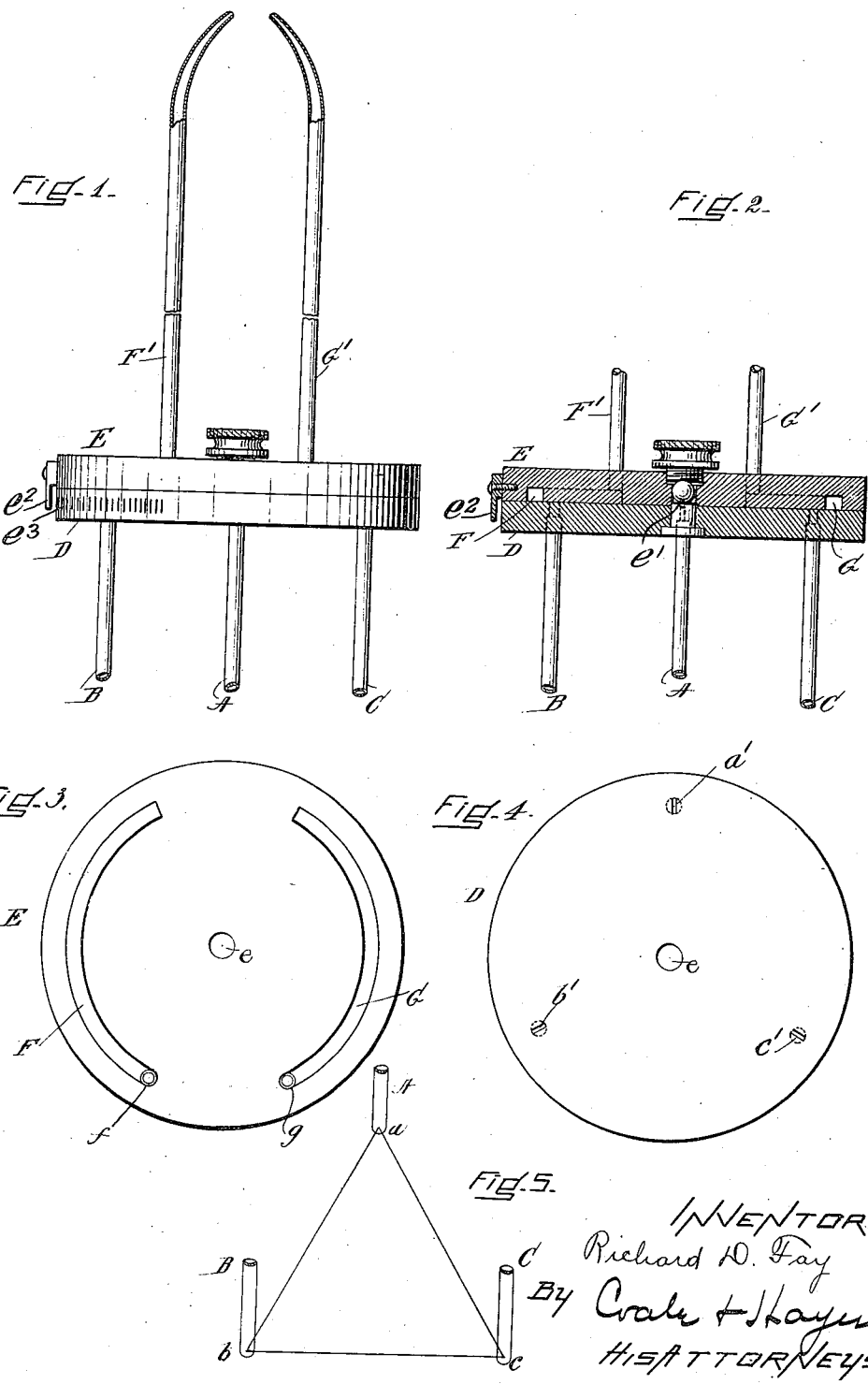

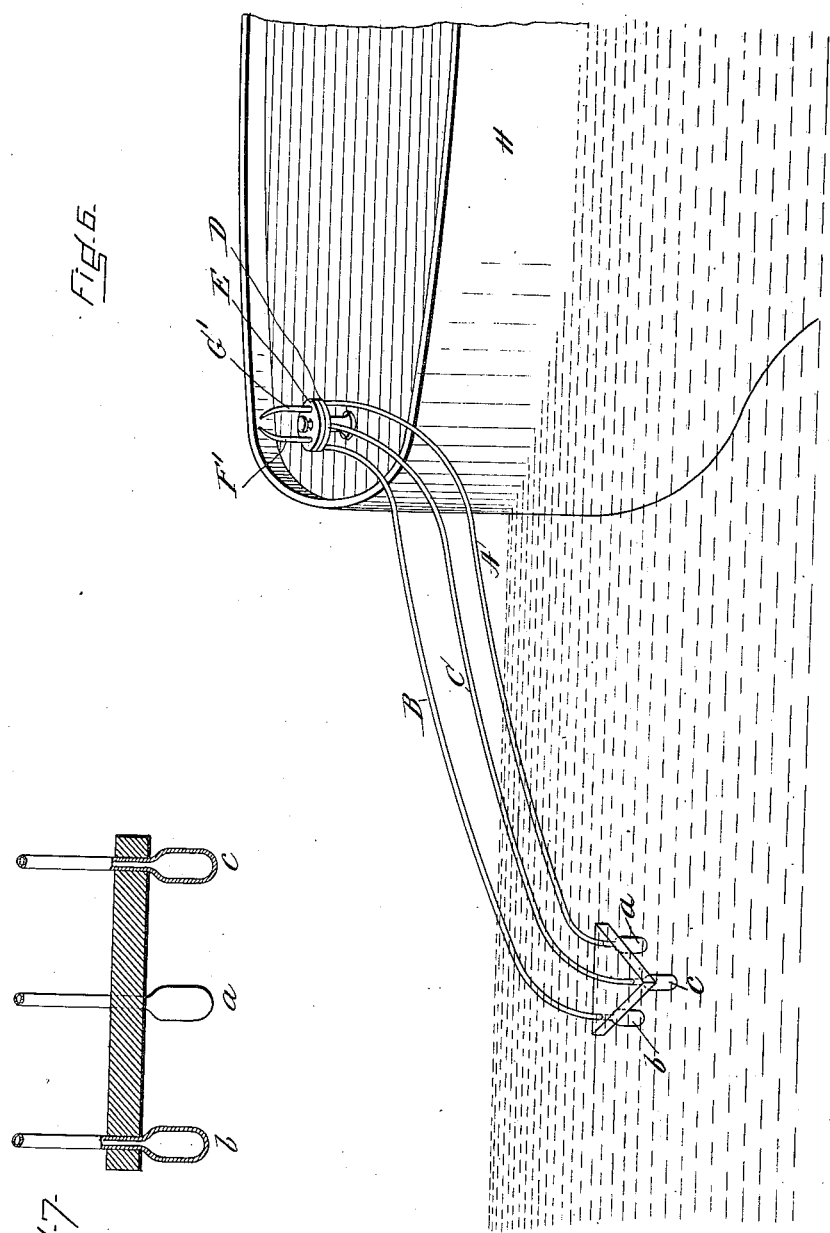

1,619,017

UNITED STATES PATENT OFFICE.

RICHARD D. FAY, OF NAHANT, MASSACHUSETTS, ASSIGNOR TO SUBMARINE SIGNAL COMPANY, OF PORTLAND, MAINE, A CORPORATION OF MAINE.

MEANS FOR FINDING DIRECTION.

Application filed June 8, 1918. Serial No. 238,839.

The main purpose of my invention is to determine from what direction signals or other sounds proceeding from a distant point are arriving. It consists primarily in providing a plurality of receivers of any convenient character, say for illustration three located at a distance (say four feet) apart and preferably attached to a triangular frame so that they will receive a signal at different instants according as they are distanced from the source of sound, any two of which receivers may be connected at the same moment with ear pieces of some kind for the observer's use through a compensator, which brings the sounds from two connected receivers to the observer at the same instant. By comparing the sounds from all the receivers, two at a time, the direction from which the sound approaches will be indicated as below described.

Compensators heretofore known in the art, so far as I am aware, are electrical and in order to make the necessary comparison between the sounds from two of the three or more receiving units require the use of a switch by which any two units may be connected to the compensator at a time. Moreover, with such a compensator two or more scales are used by which to reckon the direction from which the sound comes.

This device is mechanical and acoustical, not electrical.

It will be evident if the sound arrives at the two receivers from the source at the same instant and reaches the observer along paths of equal efficiency at the same instant the direction of the sound will be along a line normal to a line joining the receivers. If it does not reach the observer at the same instant along paths of equal efficiency, by changing the relative efficiency of the paths, for example by lengthening or shortening the paths with relation to each other, as can be done by a compensator, it may be delivered to the observer at the same instant and by comparing the required change in the relative lengths of the paths for the sound with the equal lengths of travel used when the direction is normal to the line connecting the receivers, the angle of the direction to the normal may be determined and hence the direction from which the sound proceeds.

My invention lends itself readily to the use of the pelorus well known to navigators and having but a single scale from which the readings may be taken direct.

My invention will be understood by reference to the drawings in which a compensator for changing the effective lengths of the paths of sound is shown in its preferred and simplest form.

Figure 1 is a side elevation of the device;

Fig. 2 being a cross section thereof.

Fig. 3 is an under view of the top passage containing plate or valve, and

Fig. 4 is a top view of the under plate.

Fig. 5 is a diagram of a sound-receiving member useful in connection with the compensator.

Fig. 6 is a perspective view showing the stern of the ship with my sound-collecting apparatus submerged behind it.

Fig. 7 is a section on line 7—7 of Fig. 6.

The receiving device shown in Fig. 5 comprises a triangular frame having equal sides. At each angle is attached a sound receiver $a$, $b$, $c$ of any known character. A type of receiver which has proved useful for the purpose is shown in Fig. 7 and comprises a rubber sack the neck of which is connected to one of the tubes A, B, C. The receiver $a$ is shown in elevation. The receivers $b$ and $c$ are shown in section. The sides of this triangle are of any convenient length (say four feet) and the whole is arranged so that when it drifts overboard from a ship or is towed by one of its angles, say that carrying the receiver $a$, it will be submerged. If preferred the receivers may be mounted within the ship, submerged in a liquid-filled tank or otherwise. Connected with each sound receiver $a$, $b$, $c$ is one end of a flexible tube or other sound conveyor A, B, C, the other end of which is connected to the under side of the plate D at points equidistant from each other and also from the centre of the plate, the plate being preferably circular. This plate, which is located at an observation station, say on board ship, may be permanently supported in any convenient manner. Openings $a^1$, $b^1$, $c^1$, preferably slits radial to the centre of the plate D, connect the upper ends of the tubes A, B, C with the upper surface of the plate D, so that whatever sound waves reach the tubes A, B or C will pass up through the openings $a^1$, $b^1$, $c^1$, the plate being preferably arranged so that if the triangle is towed by the point $a$ the opening $a^1$ will be nearest the bow of the ship, that is, so that the openings $a^1$, $b^1$, $c^1$ will correspond with the relative positions of the receivers $a$, $b$ and $c$.

The top or valve plate E is constructed to rest on the plate D and is provided with a central opening $e$ through which passes a suitable screw and thumb nut by which the two plates are loosely attached together, the upper plate being preferably supported on a ball bearing $e'$ so that it may be rotated with relation to the lower plate.

The valve plate E has two segmental concentric grooves therein F, G, forming passages, and from the opposing ends $f$, $g$ of each passage and forming a continuation thereof, projects a tube $F^1$, $G^1$, the tubes as shown being like the tubes of a stethoscope, their outer ends being bent slightly so that they may fit into the observer's ears, and so convey to the observer whatever vibrations reach the passages F, G.

The passages F and G are of equal length and each is adapted to register with the openings $a^1$, $b^1$, $c^1$, but with one only of the openings at a time, each measuring say 120° of the circle, the opposing ends of the passages being 60° apart. They are then nearly long enough but not sufficiently long to overlap two of the openings $a^1$, $b^1$, $c^1$. As a result, whichever way the valve plate may be turned, each passage F, G will receive the sound from one of the tubes A, B, C. The length of travel of the sounds from the receivers $a$, $b$ or $c$ may thus be varied according as the valve plate is turned about its axis, for the sound will enter a passage and pass along it to one of the tubes $F^1$, $G^1$ and to the observer's ear.

Thus when the sound waves from a given source first strike the receiver $a$ and then the receiver $b$, if the passages through F and G and the tubes A and B from $a$ and $b$ to the observer are of equal length, they will arrive at the observer's ears at different instants, but by turning the compensator plate E the relative lengths of the passages F and G will be changed and may be so changed that the sounds will reach the two ears of the observer at the same instant. If the length of travel from the source of sound to $a$ and $b$ is the same the sound will arrive simultaneously and be heard by each ear simultaneously if the compensator is adjusted so that the paths are equal.

The purpose of the grooves F and G in the valve plate and its adjustment is to enable the observer to compensate for the difference in the length of the lines of travel of the sound to the receivers. The plate D being fixed in place and the valve plate being attached to the top of the plate D so that it may be freely turned thereon, the observer, facing the bow of the ship, listens in, placing one ear piece in each ear, and turns the valve plate E with reference to the plate D. By a complete rotation he is enabled to compare the sounds received by all the receivers at $a$, $b$ and $c$. His ear pieces are, however, connected with only two receivers at a time. He rotates the valve plate until the sound comes apparently from a point directly in front of him, when the source of sound will be indicated by a suitable pointer $e^2$ or a line drawn on top of plate E or preferably by the pointer of the pelorus mounted on the valve plate E. The sounds become of equal intensity because by the regulating of the valve plate E with its grooves with relation to the plate D, the sound coming the shorter distance has to travel through the longer tube F or G. In considering this matter it must be remembered that the plate E is turned over from its position in Fig. 3 to its position in Fig. 2 so that its grooves F and G rest over the openings $a^1$, $b^1$ and $c^1$; that neither groove can embrace two openings at a time; that the ear pieces are connected to opposing ends of the grooves and that hence when one ear piece $F^1$ of groove F is over one of the openings, say $a^1$, the other groove G is over the opening $c^1$, but the ear piece $G^1$ is fully 20° or more from the opening $c^1$ and hence the sound from $c^1$ must travel a distance equal to the length of at least 20° of the groove G, while the sound from $a^1$ travels directly from the opening $a^1$ to the ear piece $F^1$.

In taking an observation the plate E should be rotated so as to receive sounds gathered up from all three receivers $a$, $b$ and $c$, two at a time. Such preliminary observation will indicate that, for example, the sound is approaching the triangle from a point opposite one of its sides, say that between $a$ and $b$. The valve plate E will then be rotated so that the source will be in a line normal to the plane of the tubes $F^1$, $G^1$ to compare the sounds received from $a$ and $b$ only, and when they reach the observer at the same instant the pelorus will show the direction from which they come.

While tubes $F^1$ and $G^1$, i. e., mechanical elements, may be used to convey the sound to the ear; other acoustic means will occur to those skilled in the art, which may be used instead with good effect, to equalize the efficiency of the paths of travel from a plurality of receivers to the observer according to the required circumstances.

While there are in general two positions approximately opposite to each other at which a sound will reach the observer at the same instant along the two paths made by the tubes, the direction of the source of sound may be easily determined by a single pointer which may be read by a scale $e^3$, the zero point of which is towards the bow of the ship as in the case of the pelorus.

My invention consists in an improvement over other known compensators in that other compensators require the use of an electrical acoustic switch depending upon the nature of the unit in order to connect in two of the three or more units to the compensator at the same time for means of comparison. Also my invention differs from other known compensators in the fact that a single scale is used in place of the multiple scales used on other compensators. By the use of my invention the two units most advantageously located to find the direction of the source of sound automatically fall into play by the use of the compensators.

In Fig. 6 the location of the device in the water and on board the ship H is indicated, it being understood that the tubular connections between the triangular frame and the plates D, E should be of equal length so that the distance which the sound waves will travel from the frame to the passages F and G will always be the same. The elements a, b and c may be air bulbs of rubber or the like as shown or may be of other shape or of such character as to be operated mechanically by the received compressional waves and transmit them mechanically and not electrically to the device D, E.

What I claim as my invention is:

1. That method of determining the direction of the source of sound from the observer, which comprises receiving the sound waves from said source on three or more receivers, selecting the two receivers best situated to give the direction to the observer, and conveying the sound therefrom along paths of variable efficiency and varying the efficiency of such paths, whereby the sounds from both receivers will reach the observer at the same instant.

2. That method of determining the direction of the source of sound from the observer, which comprises receiving the sound waves from said source on three or more receivers, selecting the two receivers best situated to give the direction to the observer, and conveying the sound therefrom along and conveying the sound therefrom along paths of variable efficiency and varying the efficiency of said paths, whereby the sounds from both receivers will reach the observer at the same instant and the direction from which the sound proceeds will be indicated.

3. A mechanical sound direction-determining apparatus comprising a plurality of sound receivers, means for indicating to the observer the reception of sounds from any two of said receivers, and means located between said receivers and said indicating means and connected to both for selecting two of said receivers and equalizing the time of reception at said indicating means of the sounds from the selected receivers.

4. A plurality of sound receivers and means for supporting them in constant relation to each other, a plate having a series of acoustic connections one with each receiver, ear pieces and acoustic means located between said plate and said ear pieces whereby the adjustment of said acoustic means will simultaneously change the length of travel of sound vibrations from two of said receivers to said ear pieces.

5. A plurality of sound receivers and means for supporting them in constant relation to each other, a plate having a series of acoustic connections one with each receiver, ear pieces, and acoustic means located between said plate and said ear pieces whereby the adjustment of said acoustic means will simultaneously change the length of travel of sound vibrations from two of said receivers to said ear pieces, and means mounted on said adjusting means whereby the direction from which the sound proceeds will be indicated.

6. A plurality of sound receivers and means for supporting them, a plate having a series of connections, one with each receiver, and having mounted and adjustable thereon a valve plate having grooves located to register with said connections, and ear tubes connected to said grooves and adapted to convey sound to the ears of the observer.

7. The combination with a compensator having two separate sound paths relatively variable at will to alter the phase relation of the sounds in the two paths, of three sound collectors mounted out of alignment, and means for transmitting sound from each of said collectors to said compensator, said compensator being adapted to connect any two of said collectors to the two sound paths.

8. In apparatus of the character described, the combination of a plurality of receivers of wave energy and means for transmitting and utilizing the received wave energy comprising energy-transmitting paths from the several receivers including air columns and selective means to bring the sound vibrations from a predetermined number of said receivers into phase.

RICHARD D. FAY.